United States Patent
Benz et al.

(10) Patent No.: US 8,169,636 B2
(45) Date of Patent: May 1, 2012

(54) METHOD, COMPUTER AND COMPUTER PROGRAM MODULES TO TRANSFER DATA IN A COMPUTER NETWORK, AND SUCH A COMPUTER NETWORK

(75) Inventors: Viktor Benz, Kirchseeon (DE); Armin Gnaedig, München (DE); Herman Lankreijer, Hofsingelding (DE); Thomas Harms, Freising (DE)

(73) Assignee: Oce Printing Systems GmbH, Poing (DE)

( * ) Notice: Subject to any disclaimer, the term of this patent is extended or adjusted under 35 U.S.C. 154(b) by 2791 days.

(21) Appl. No.: 10/815,038

(22) Filed: Mar. 31, 2004

(65) Prior Publication Data

US 2004/0239985 A1 Dec. 2, 2004

(30) Foreign Application Priority Data

Mar. 31, 2003 (DE) .................................. 103 14 548

(51) Int. Cl.
*G06F 3/12* (2006.01)
*G06K 15/00* (2006.01)
*G06F 15/16* (2006.01)
*G06F 3/00* (2006.01)
*G06F 13/22* (2006.01)
*G06F 13/36* (2006.01)
*H04N 1/00* (2006.01)

(52) U.S. Cl. ...... 358/1.15; 358/1.14; 358/400; 709/203; 709/219; 710/8; 710/15; 710/16; 710/220; 710/306

(58) Field of Classification Search ................. 358/1.14, 358/1.15, 1.1, 400; 710/8, 15, 16, 220, 306; 709/203, 219, 220; 370/230, 401, 235, 471, 370/470, 465; 700/22, 286, 295; 705/10, 705/27, 56, 295, 412, 102; 707/10, 102, 707/214; 711/154
See application file for complete search history.

(56) References Cited

U.S. PATENT DOCUMENTS

| | | | | |
|---|---|---|---|---|
| 6,418,519 | B1 * | 7/2002 | Cadden et al. | 711/154 |
| 6,535,518 | B1 * | 3/2003 | Hu et al. | 370/401 |
| 7,262,872 | B2 * | 8/2007 | Nakamura | 358/1.14 |
| 2002/0063891 | A1 * | 5/2002 | Ueda et al. | 358/1.15 |

FOREIGN PATENT DOCUMENTS

| | | |
|---|---|---|
| DE | 101 07 377 | 11/2001 |
| DE | 100 17 785 | 4/2002 |
| DE | 102 03 869 | 8/2003 |

OTHER PUBLICATIONS

Oce PRISMpro Server System Manfred Mertgen et al Kapitel 14.

* cited by examiner

*Primary Examiner* — King Poon
*Assistant Examiner* — Neil R McLean
(74) *Attorney, Agent, or Firm* — Schiff Hardin LLP

(57) ABSTRACT

In a method, a computer, and computer program modules to transfer data between servers of a computer network, a computer program module supplying the data from a first server is provided, and a reading computer program module is provided that reads the supplied data, and wherein one of the following transmission modes is selected:

1) a complete storage of the data in a file occurs before the reading computer program module reads the data;
2) a segment-by-segment storage of the data in a file occurs such that the reading computer program module already begins with the reading of a segment while the supplying computer program module is still supplying data; and
3) a direct transmission of the data between the supplying computer program module and the reading computer program module occurs without buffering.

17 Claims, 2 Drawing Sheets

METHOD, COMPUTER AND COMPUTER PROGRAM MODULES TO TRANSFER DATA IN A COMPUTER NETWORK, AND SUCH A COMPUTER NETWORK

BACKGROUND

The invention concerns a method, a computer and computer program modules with which data can be transferred between various components of a computer network. In particular, the invention concerns a method, a device system and computer program modules with which print data are be transferred between a plurality of devices, stored and retrieved.

In high-capacity printing systems, in variable print data and resources (forms, fonts etc.) are combined into what are known as print jobs and are transferred from a data source in a print production system. Such systems (which comprise computers, control units and print devices) are, for example, specified in the publication "Das Druckerbuch", published by Dr. Gerd Goldmann (Océ Printing Systems GmbH), 6th edition (May 2001), ISBN 3-00-001019-x. In chapter 14, the server system Ocè PRISMApro is specified. This flexible print data server system is, for example, suited to convert print data from data sources (such as a source computer that provides print data in a specific print data language such as AFP (Advanced Function Presentation), PCL (Printer Command Language), PostScript, SPDS (Siemens Print Data Stream) or LCDS (Line Coded Data Stream)) and to transfer it to a print production system. The print data server system is thereby comprised of at least one master print server and possibly a few slave print servers. The print data can be read in by the master print server from various sources, if necessary converted, transmitted to the slave print servers, and from there transferred in parallel to a plurality of printers. Depending on the type of data and the involved components, different requirements with regard to the data throughput and the data preservation between the involved components exist for the overall data transmission. This requires a flexible method of data transmission that enables a transmission with high data throughput, if necessary ensuring the preservation of the data for a later access, can be applied across computer boundaries, and is easy to integrate into existing methods.

SUMMARY

It is an object to be able to implement the data transmission between various components in a network of servers, optimized for time and controlled by applications.

In a method and system to transfer data in a network of servers, a computer program module supplying data from a first server is provided. A reading computer program module is provided that reads the supplied data. One of the following transmission modes is selected:

a complete storage of the data in a file occurs before the reading program module reads the data, a segment-by-segment storage of the data in a file occurs such that the reading computer program module already begins with a reading of a segment while the supplying computer program module is still supplying data, and a direct transmission of the data between the supplying computer program module and the reading computer module occurs without buffering.

DESCRIPTION OF THE PREFERRED EMBODIMENTS

Figure 1:
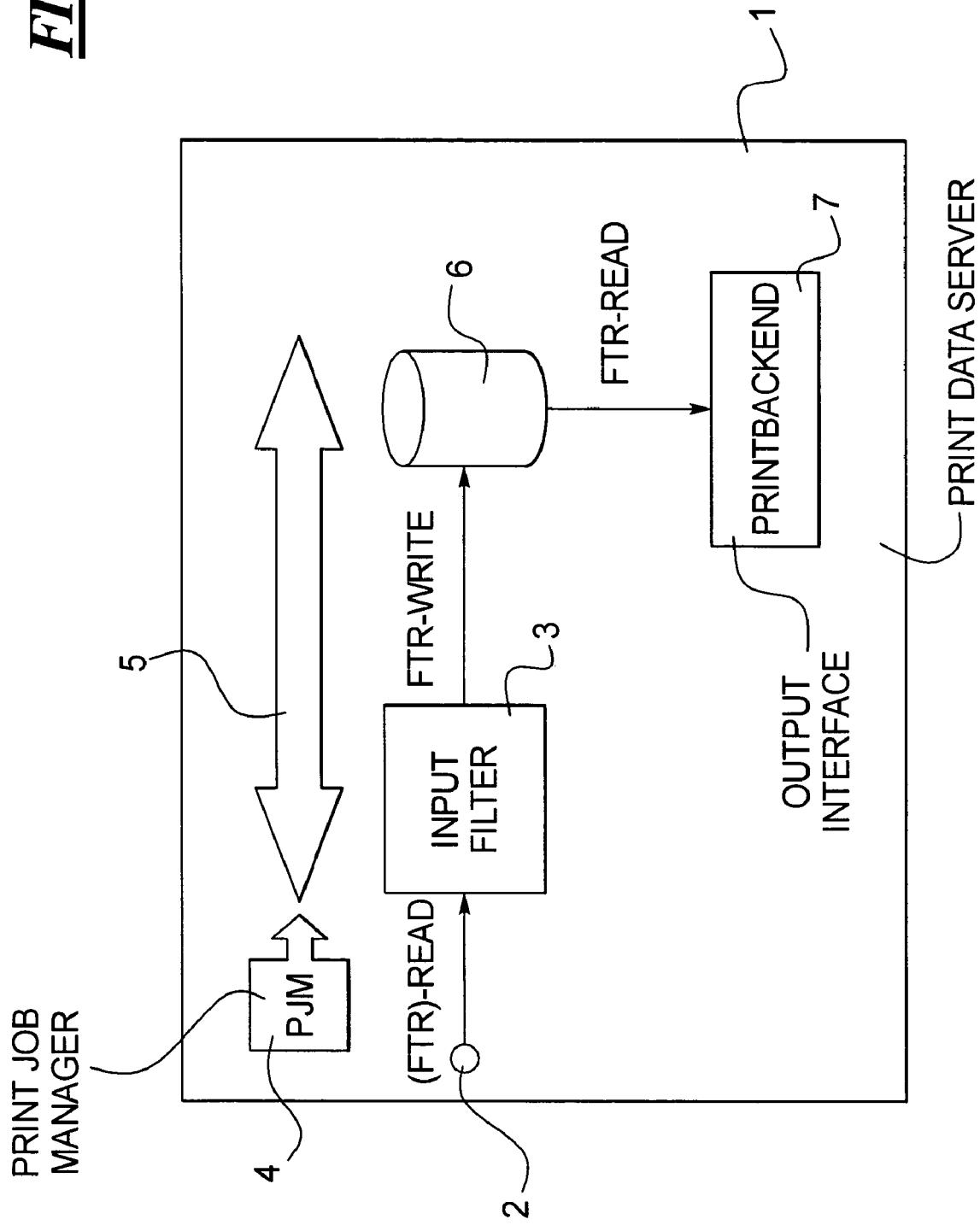
FIG. 1 illustrates a flow diagram for processing of print data.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A method to transfer data in a network of servers is inventively provided, whereby a computer program module supplying the data from a server is provided, and whereby a reading computer program module is provided that reads the supplied data, whereby one of the following transfer modes is selected:

(a) a complete storage of the data in a file occurs before the reading computer program module reads the data, (b) a segment-by-segment storage of the data in a file occurs such that the reading computer program module already begins with the reading of a segment while the supplying computer program module is still supplying data, and (c) a direct transmission of the data between the supplying computer program module and the reading computer program module is provided without buffering.

The transmission mode can thereby in particular be selectively controlled by parameters. The reading computer program module and the computer program module supplying the data thereby in particular cooperate via the control parameters.

The computer program module supplying the data is subsequently also called the first component, and the computer program module reading the supplied data is also called the second component. Furthermore, in place of the term server the term computer is also used, and vice versa.

With the preferred embodiment, data can be transferred from a first component of a network of print data servers to a second component in different ways and controlled by the first component. The data are thereby "written" by the first component, as in a storage in a file, and "read" by the second component. The dependence on the ordinary storage of data enables a simple implementation of the functionality by the user. The following possibilities for data transmission thereby exist, independent of whether the involved components operate on the same or different computers:

1. The transmission actually occurs via a file with a buffering. The first component first writes the data in the storage. After the end of this event, a second component can read this data from the storage. This transmission manner is, for example, advantageous when the second component from the beginning requires the complete data, including the last-written data, for its next work step, as this can be required in specific conversion procedures.

2. The transmission occurs with buffering and what is known as "X-while-X" functionality, meaning that the reading component and processes connected with it (such as, for example, a print event) can already be started while the component supplying the data is still supplying data. The second component thereby begins reading the data, in particular immediately after the first component has begun the writing. Given reading of the data by the second component, it can thereby occur that momentarily no data to be read is present, although the entirety of the data has not yet been transmitted. In an advantageous embodiment, the possibility now exists that the read event of the second component reacts differently to this situation. On the one hand, the possibility exists that the read event is continuously repeated until data can again be read or until it is certain that the first component no longer supplies further data. The second component is then found in a wait state until new data can be read. On the other hand, the read event can in this case by interrupted and continued at a later point in time. In this type of data transmission, the data remain in the storage after the transmission in order to, for example, by re-read at a later point in time.

3. The transmission occurs directly between components without buffering. The possibility thereby likewise exists for the second component to always repeat the read event in the event that data can be no longer be read before the end of the data transmission is achieved, or to abort the read event and subsequently to restart it.

The necessary manner of the data transmission can be controlled as needed by each component. If the overall event is the execution of a print job, the manner of the transmission can be established for each involved component via the corresponding control data (job ticket data).

Furthermore, the possibility exists to transmit the data in an established block format. The reading component in this case receives the data in the form of specific data blocks that have been determined by the writing component. In this manner it is guaranteed that the reading component receives the data in precisely the block format as the writing component provides it. A subsequent merging or division of the data in the reading component is thus prevented.

If the data are stored in the transmission, further information about this file can be queried. The temporary read or write position in the file can be queried. The size of the file can be determined. The possibility exists to test whether the file end has been achieved with current position. Differentiation is thereby made between the actual file end after the end of the writing of the data by the writing component and a preliminary file end that was already reached by the reading component given the "X-while-X" functionality, but in expectation of further data from the writing component does not yet represent the actual file end.

In the case of the storage of the data, this functionality can be newly positioned within the data. This functionality is, for example, necessary when the data processing must be restarted to continue at a specific point of the data stream after the interruption of a print job.

In the preferred embodiments, respectively corresponding functions are executed by both components in addition to a data transmission that uses the manner of transmission with "X-while-X" functionality shown above. This is not possible for the writing component because the data are transmitted, for example, from an outside system, thus a further component can mark the file created by the writing component as "writing" without, however, writing data in the file itself. The reading component can now receive the data with the "X-while-X" functionality.

All previously described functionalities of the preferred embodiments can be applied in the framework of the data transmission between two components on the same print server or between two components on two different print servers networked with one another. The writing component can thereby write the data only on its print server, but the reading component can receive the data from it or from a print server networked with its print server.

A further aspect of the preferred embodiments concerns the situation that data is no longer present for the reading program. Differentiation is thereby made between both of the cases 2 (transmission with buffering) and 3 (direct transmission without buffering) cited above. In case 2, the user in any case receives a corresponding message that data is no longer available. The user can then decide whether the read is to be continually retried in a loop or to abort the read attempt and, if necessary, to implement other work processes and continue the read at a later point in time. In the case 3, a parameter "non-block" can be specified upon opening the file. Depending on whether this parameter is assigned, given the direct transmission either a notice is delivered to the user that at the time it cannot be read, or (when the parameter is not set) the reading process waits a default time until data is again present for reading.

The difference between the procedures of both cases 2 and 3 is thus that in the second case, the user must decide, while in the third case, when the parameter is not set, the read process automatically goes into the wait state. The functionality supported in the third case can in particular be supported in that the first component and the second component are connected with one another via a operating system-specific or operating system-proprietary functionality, what is known as a socket connection, which for its part offers such a possibility.

Furthermore, a computer program module is provided that effects a inventive method procedure upon loading and execution on a computer in cooperation with a further computer program module. Both computer computer or essentially run on two different computers that are connected with one another via a network connection.

Furthermore, a computer a system to implement the method is provided, as well as a computer network with a system to implement the method.

It is illustrated in FIG. 1 how print data are processed in a print data server. The print data are thereby read in via an input interface 2, and in particular are filtered via an input filter 3 that checks the data in terms of its data integrity and, as necessary, undertakes changes. In an independent process, control data with which the processing or further processing of the print data can be controlled are generated and/or provided in a print job manager 4. The control data directly act on the processes in a job distribution system (order distribution system) 5. Data that have been filtered in the input filter 3 are then written in a print filter 6. From there, the print data are transferred to an output interface 7 in a read process (FTR-read). From there, they are either supplied to another print data server for further processing or are directly output to a printer for printing.

The write process (FTR-write) in the print file 6 that is executed by a writing computer program module and the read process (FTR-read) from the print file 6 that is executed by a reading computer program module are thereby designed such that the transmission of the data from the input filter 3 to the output interface 7 occurs controlled by a parameter that has been predetermined in the print job manager 4, with the following possibilities:

1) Either the transmission occurs via the print file 6 with a buffering, whereby first all print data of a print job are stored in the buffer before the print data are read out into the output interface 7. This transmission method is, for example, necessary when a subsequent process that taps the data at the output interface 7 requires the complete data of the print job at the start.

2) As an alternative to this, the transmission of the data from the input filter 3 to the output interface 7 can occur such that, during the writing of data from the input filter 3 into the print file 6, other data that have already been stored beforehand are read out from the print file 6 into the output interface 7. When, for example, the print data are directly transferred to a print device from the output interface 7, what is known as a Print-While-Spool functionality can thereby be realized in which the first print data are already printed out while subsequent print data are still being written in the print file 6.

3) Finally, the possibility exists that the print data are directly transferred from the input filter 3 to the output interface 7, whereby both computer program modules that control the write event (FTR-write) and the read event (FTR-read) are designed such that the direct transmission is possible without buffering. A storage in the print file 6 thereby does not occur.

Figure 2:
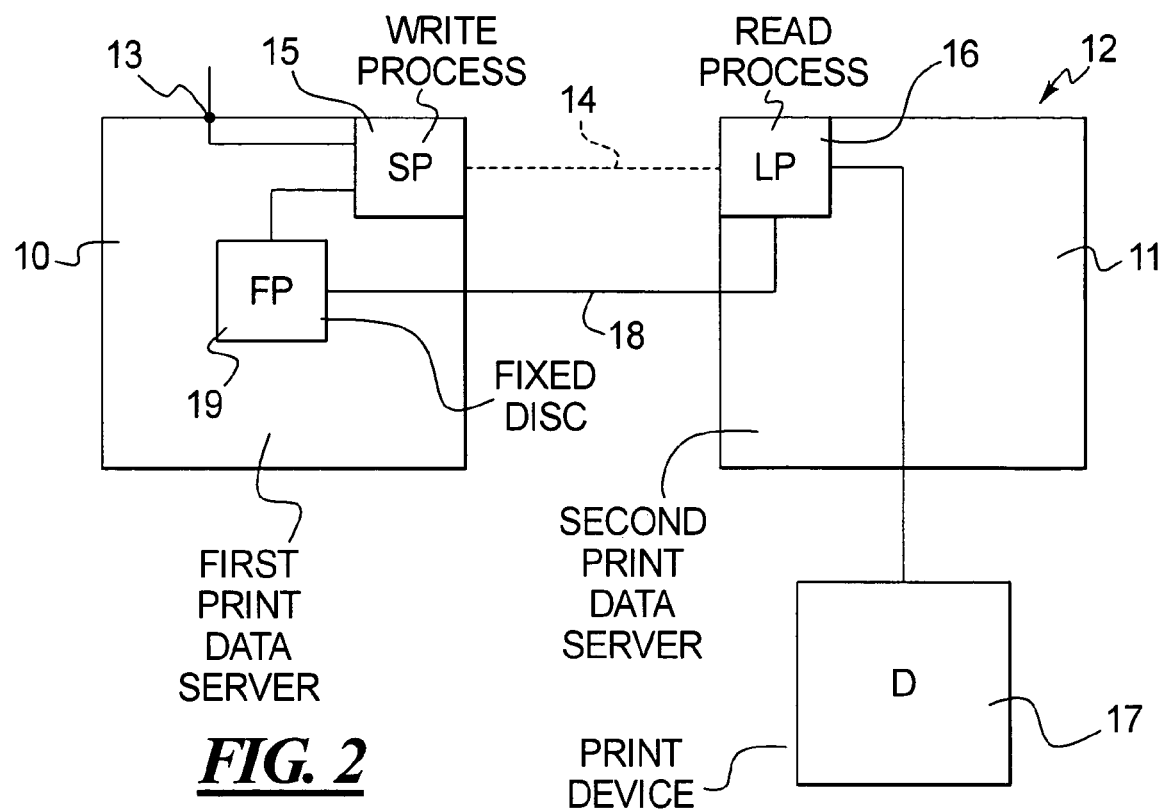
FIG. 2 illustrates a print data server network.

In FIG. 2, a network 12 is shown in which a first print data server 10 is connected with a second print data server 11 via a network connection 18. Print data are read into the first print data server 10 via an input interface 13. To transmit the print data from the first print data server 10 to the second print data server 11, a first computer program module that controls a write process 15 in the first print data server 10 cooperates with a reading computer program module that controls a read process 16 in the second print data server 11. This effects a process connection 14 of the read process 16 with the write process 15. A control parameter determines the type of data transmission between the two print data servers 10, 11. The write process 15 which receives the data via the interface 13, for example via a download process, provides these data to the read process 16. There are thereby three variations as described hereafter.

In a first variation, the data are completely written as a file on the fixed disc 19 of the first print data server 10 and the read process subsequently reads the data from the fixed disc 19. The write process 15 thereby operates locally on the first print data server 10, while the read process 16 can read across computers, thus itself runs on the second print data server 11 but reads the data from the first print data server 10 from its fixed disc 19. The read process 16 can then output these data, for example to a print device 17 as shown in FIG. 2, or can transfer the data to another system or store the data on a fixed disc in the second print data server 11.

In a second variation, the read process 16 already reads data from the fixed disc 19 of the first print data server 10 via the network connection 18 while the write process 15 is still writing data to the fixed disc 19 (x-while-x process).

In order to transfer data across computers from the print data server 10 to the print data server 11, a read process dependent on the read process 16 of the second print data server is set up on the first print data server, the dependent read process being connected with the read process 16 of the second print data server via a socket connection. The read process in the first print data server receives from the read process 16 of the second print data server a trigger signal to read the data, and sends this back to the read process 16 via the socket connection.

With regard to control characters, a file-end control character (End of File, EoF) and a data-end control character (End of Data, EoD) are provided. Given the presence of the EoF control character, it is indicated that the writing process 15 is concluded and the file is closed. The reading process is then likewise closed. Given the presence of the EoD control character, it is indicated that the writing process 15 is writing further data. The file remains open and the reading process waits for subsequent data and leaves the file open.

When the socket connection cited above exists, the buffer file is opened for reading a parameter that establishes the various further handling possibilities when data is no longer present. On the one hand, a waiting action can thereby be triggered, or on the other hand a request can be issued to the user in order to initiate selectable further process steps.

The write process 15 outputs an EoD control signal when a maximum file size (buffer size) is reached.

Figure 3:
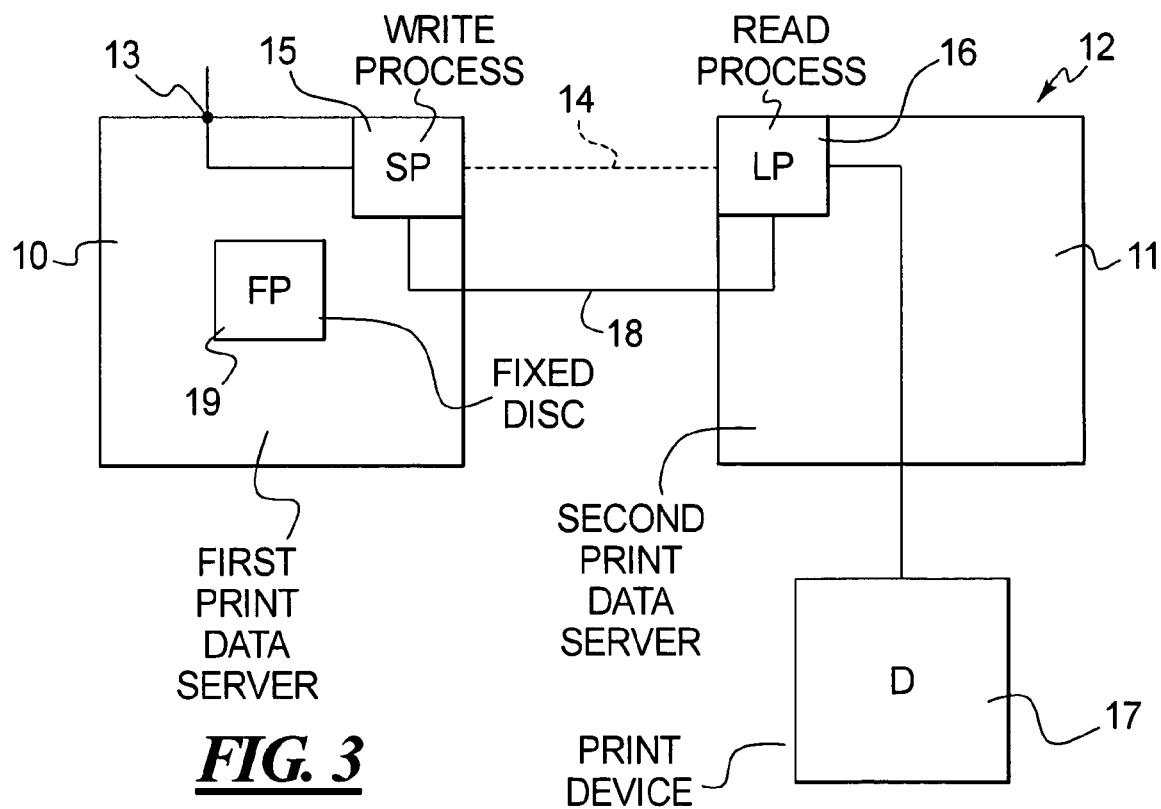
FIG. 3 illustrates the print data server network of FIG. 2 in another operating mode.

In FIG. 3, the arrangement of FIG. 2 is shown, whereby here a socket connection exists between the computer program modules that implement the write process 15 or the read process 16. Based on this connection, the print data are forwarded from the interface 13 directly to the print device 17 without buffering on the fixed disk 19. The data are transferred without buffering between the writing and reading computer program modules. The remaining options and functions of this operating mode already specified above can also hereby be used. The writing computer program module and the reading computer program module are thereby directly connected via a computer-internal fixed interface (PORT) that can also be used across computers.

Although the system and method were predominantly specified in examples in a print production environment, it can also be used just as well for other data-technical systems in which data must be exchanged in a computer network.

The system and method are in particular suited to be realized as a computer program (software). In particular, it comprises the supplying computer program module and the reading computer program module, and can be distributed as a file or file collection on a data medium such as a diskette or CD-ROM, or via a data or, respectively, communication network. Such and comparable computer program products or computer program elements are embodiments of the system.

The system and method can be applied in a computer, in a print data or in a print system with upstream or downstream data processing devices. It is thus clear that corresponding computers on which the system and method are used can comprise further known technical devices such as input devices (keyboard, mouse, touchscreen), a microprocessor, a data or control bus, a display device (monitor, display) as well as a working storage, a fixed disc storage and a network card.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

We claim as our invention:

1. A method to transfer print data in a server system having a first print data server, comprising the steps of:
    providing the first print data server with a supplying computer module as a computer-readable medium having a computer program and which supplies print data;
    providing a reading computer module as a computer readable medium having a computer program that reads the supplied print data;
    selecting one of the following transmission modes
        a complete storage of the print data in a file occurs before the reading computer module reads the print data,
        a segment-by-segment storage of the data in a file occurs such that the reading computer module already begins with the reading of a segment while the supplying computer module is still supplying print data, and a direct transmission of the print data between the supplying computer module and the reading computer module occurs without buffering;

controlling the selecting of the transmission mode by at least one control parameter predetermined in a print job manager, the reading computer module and the supplying computer module cooperating via the at least one control parameter; and also controlling the selecting of the transmission mode dependent on the print job.

2. A method according to claim 1 wherein in the transmission mode with the direct transmission of the data, the reading computer module reacts, controlled by at least one parameter, in one of the following manners when data to be read no longer exists:

the read event is continuously repeated until data to be read is present, or until the reading computer module receives the notification that data is no longer being supplied, or the read event is aborted.

3. A method according to claim 1 wherein the data are supplied in blocks in a block format determined by the supplying computer module.

4. A method according to claim 1 wherein the data transmission of the data occurs via a socket connection established between the supplying computer module and the reading computer module.

5. A method according to claim 1 wherein given the storage in segments of print data, print data of a print job are already further processed via the reading computer module in a subsequent process, while subsequent print data of the same print job are still being stored.

6. A method according to claim 1 wherein the transmission mode to be applied is established dependent on the print job in a print job corollary file.

7. A method according to claim 1 wherein the reading computer module runs on a second print data server.

8. A method according to claim 1 wherein both the supplying computer module and the reading computer module run on the first server.

9. A method to transfer data in a print data service system comprising at least first and second print data servers, comprising the steps of:

providing the first print data server with a supplying computer module as a computer readable medium having a computer program supplying print data;

providing the second print data server with a reading computer module as a computer-readable medium having a computer program that reads the supplied print data;

selecting one of the following transmission modes a complete storage of the print data in a file occurs before the reading computer module reads the print data, a segment-by-segment storage of the data in a file occurs such that the reading computer module already begins with the reading of a segment while the supplying computer module is still supplying print data, and a direct transmission of the print data between the supplying computer module and the reading computer module occurs without buffering;

controlling the selecting of the transmission mode by at least one control parameter predetermined in a print job manager, the reading computer module and the supplying computer module cooperating via the at least one control parameter;

also controlling the selecting of the transmission mode dependent on the print job;

the data being supplied in blocks in a block format predetermined by the supplying computer module; and given the storage in segments of print data, print data of a print job are already further processed via the reading computer module in a subsequent process, while subsequent print data of the same print job are still being stored.

10. A computer program system to transfer data in a network of print data servers, comprising:

a first print data server comprising a supplying computer module as a computer-readable medium having a computer program supplying print data;

a reading computer module as a computer-readable medium having a computer program that reads the supplied print data;

the supplying computer module and the reading computer module employing one of the following transmission modes a complete storage of the data in a file occurs before the reading computer module reads the data the segment-by-segment storage of the data in a file occurs such that the reading computer module already begins with the reading of the segment while the supplying computer module is still supplying data, and a direct transmission of the data between the supplying computer module and the reading computer module occurs without buffering;

a print job manager having at least one predetermined control parameter for controlling the selecting of the transmission mode such that the reading computer module and the supplying computer module cooperate via the at least one control parameter; and the print job manager also controlling the selecting of the transmission mode dependent on the print job.

11. The system of claim 10 wherein in the transmission mode with the direct transmission of the data, the reading computer module reacts, controlled by said at least one parameter, in one of the following manners when data to be read no longer exists:

the read event is continuously repeated until data to be read is present, or until the reading computer module receives the notification that data is no longer being supplied, or the read event is aborted.

12. The system of claim 10 wherein the data are supplied in blocks in a block format predetermined by the supplying computer module.

13. A system according to claim 10 wherein the data transmission of the data occurs via a socket connection established between the supplying computer module and the reading computer module.

14. A system according to claim 10 wherein given storage in segments of print data, print data of a print job are already further processed via the reading computer module in a subsequent process, while subsequent print data of the same print job are still being stored.

15. A system according to claim 10 wherein the supplying computer module runs on the first server and the reading computer module runs on a second print data server.

16. A system according to claim 10 wherein both the supplying computer module and the reading computer module run on the first print data server.

17. A system according to claim 10 wherein the transmission mode is selected controlled by a plurality of parameters, and wherein the reading computer module and the supplying computer module cooperate via the parameters.

* * * * *